(12) United States Patent
Awazu et al.

(10) Patent No.: US 7,679,656 B2
(45) Date of Patent: Mar. 16, 2010

(54) IMAGE TAKING SYSTEM

(75) Inventors: Kouhei Awazu, Asaka (JP); Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 856 days.

(21) Appl. No.: 11/480,860

(22) Filed: Jul. 6, 2006

(65) Prior Publication Data

US 2007/0013789 A1 Jan. 18, 2007

(30) Foreign Application Priority Data

Jul. 13, 2005 (JP) ............................. 2005-204695

(51) Int. Cl.
*H04N 5/76* (2006.01)
*H04N 5/225* (2006.01)
(52) U.S. Cl. ............................. 348/231.99; 348/207.99; 358/1.6
(58) Field of Classification Search .................. 369/57, 369/58; 358/1.6, 1.15, 1.16, 1.17, 1.1, 1.9, 358/408, 474, 302, 296; 396/439, 429, 297, 396/268, 57, 58, 310, 59, 52, 54, 315, 321; 348/211.99, 207.99, 231.99, 231.9
See application file for complete search history.

(56) References Cited

U.S. PATENT DOCUMENTS 5,184,167 A * 2/1993 Iida et al. ...................... 396/59
6,337,951 B1 * 1/2002 Nakamura .................... 396/57

FOREIGN PATENT DOCUMENTS

JP         7-13225 A     1/1995
JP      2001-228528 A     8/2001

* cited by examiner

*Primary Examiner*—Dov Popovici
(74) *Attorney, Agent, or Firm*—Birch, Stewart, Kolasch & Birch, LLP (57) ABSTRACT

An image taking system of the invention has a transmitter and an image taking apparatus. The transmitter is disposed near a subject and transmits subject information of the subject. The image taking apparatus has a receiver capable of receiving the subject information transmitted from the transmitter and stores in memory the subject information received by the receiver in association with image data representing a subject image obtained by image taking through an image taking lens. The transmitter transmits the subject information in a predetermined direction. The receiver is capable of receiving the subject information within a predetermined range around an optical axis of the image taking lens.

3 Claims, 8 Drawing Sheets

IMAGE TAKING SYSTEM

BACKGROUND OF THE INVENTION

1. Field of the Invention

The present invention relates to an image taking system including a transmitter and an image taking apparatus. More particularly, the transmitter is disposed near a subject and transmits subject information regarding the subject, and the image taking apparatus has a receiving unit capable of receiving the subject information and stores the subject information in a memory in association with image data representing a subject image obtained through image taking operation.

2. Description of the Related Art

Amid the recent trend for high-capacity memory and storage media, it has become difficult for a user to promptly obtain a desired subject image from subject images taken by an image taking apparatus such as a digital camera and stored in memory and storage media.

Japanese Patent Application Publication No. 2001-228528, for example, proposes a technique to enable prompt extraction of a desired image.

More particularly, this technique attaches data on date and Global Positioning System (GPS) to image data representing a subject image and extracts a desired data based on the attached data.

When shooting a moving subject, for example, a person on a roller coaster, shutter speed needs to be adjusted in order to obtain a clear image of the subject. Japanese Patent Application Publication No. 1995-13225, for example, discloses an image taking system including a transmitter that is disposed near a subject and transmits image taking information and an image taking apparatus that has a receiver capable of receiving the subject information, so that shooting is performed in accordance with the received image taking information.

Accordingly, it can be contrived that a transmitter is adapted to transmit subject information that is a profile of a subject as well as image taking information, and an image taking apparatus with a receiver is adapted to store image data representing a subject image shot based on the received image taking information in association with the received subject information.

However, in the case where subjects are positioned closely one another, for example, monkeys in a zoo, transmitters naturally are to be closely disposed. Accordingly, an image taking apparatus may attach wrong subject information to the image data representing a shot subject.

It can be contrived to add a GPS receiver and a direction finder to an image taking apparatus, and cause a transmitter to transmit information of a position and a direction of the image taking apparatus as well as shooting information and subject information. Based on transmitted positional and directional information of the image taking apparatus that matches those detected by the image taking apparatus itself, the image taking apparatus can attach the subject information to image data representing the shot subject image.

However, even with the above contrivance, a subject image may not reportedly match subject information attached thereto, making it hard to obtain a desired subject image.

SUMMARY OF THE INVENTION

The present invention has been made in view of the above circumstances, and provides an image taking system that makes it possible to rapidly obtain a desired subject image.

A first aspect of the present invention provides an image taking system including:

a transmitter that is disposed near a subject and transmits subject information of the subject; and an image taking apparatus that has a receiver capable of receiving the subject information transmitted from the transmitter and stores in a memory the subject information received by the receiver in association with image data representing a subject image obtained by image taking through an image taking lens, wherein the transmitter transmits the subject information in a predetermined direction, and the receiver is capable of receiving the subject information within a predetermined range around an optical axis of the image taking lens, and the image taking apparatus stores in the memory the subject information received by the receiver within the predetermined range in association with the image data.

According to the first aspect of the image taking system of the invention, light emitted from the transmitter and received by the image taking apparatus is highly directional. Besides, light is received around the optical axis of the image taking lens, so that a subject image obtained through image taking by the image taking apparatus can match the content of subject information more readily than conventional techniques. Accordingly, the first aspect of the image taking apparatus realizes prompt extraction of a desired subject image.

In the first aspect of the image taking apparatus, it is preferred that the transmitter has a light source and drives the light source to modulate light emitted therefrom according to subject information such that the light emitted from the light source is adapted to transmit the subject information. Also preferably, the receiver has a light receiving element that receives the emitted light, and the image taking apparatus stores in the memory the subject information obtained from signals output from the light receiving element in association with the image data.

More preferably, the transmitter is adapted to transmit the subject information by field angle, and the image taking apparatus is adapted to freely change field angle of a subject. The image taking apparatus may further have a field angle detecting unit, and stores in the memory the subject information by field angle, out of all the subject information received by the receiver, that corresponds to the field angle detected by the field angle detecting unit, in association with the image data.

By storing the subject information corresponding to the detected field angle, it is also possible to obtain a desired image promptly.

A second aspect of the present invention provides an image taking system has:

a transmitter that is disposed near a subject and transmits subject information of the subject; and an image taking apparatus that has a receiver capable of receiving the subject information transmitted from the transmitter and stores in a memory the subject information received by the receiver in association with image data representing a subject image obtained by image taking through an image taking lens, wherein the image taking apparatus further has:

a display unit that displays the subject information received by the receiver; and a storage information selecting unit that selects subject information to be stored from the subject information displayed on the display unit, wherein the image taking apparatus stores in the memory the subject information selected by the storage information selecting unit in association with the image data.

According to the second aspect of the image taking apparatus, it is possible to select, out of all received subject information, the subject information corresponding to the taken subject image and stores the selected subject information in association with image data representing the subject image.

As described above, the image taking apparatus of the invention can realize prompt extraction of a desired subject image.

BRIEF DESCRIPTION OF THE DRAWINGS

The invention will be described with reference to the accompanying figures of which.

DETAILED DESCRIPTION OF THE INVENTION

Embodiments of the present invention will be described below with reference to the drawings.

Figure 1:
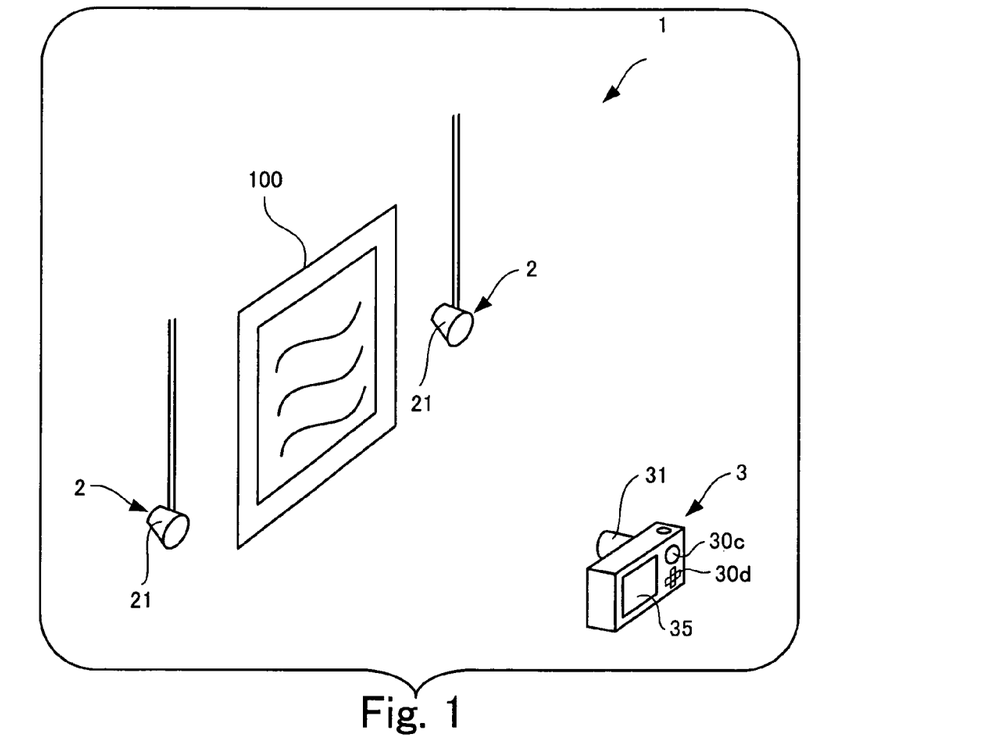
FIG. 1 shows a conceptual illustration of an embodiment of a first image taking system according to the present invention.

FIG. 1 shows a conceptual illustration of an embodiment of a first image taking system according to the present invention.

An image taking system 1 is composed of emitters 2 and a digital camera 3. The emitters 2 are disposed near a subject and drives a light source to modulate light emitted therefrom in accordance with subject information and thereby causes the light emitted from the light source to transmit subject information. The emitters 2 are also adapted to emit light in a predetermined direction. The digital camera 3 has a receiver capable of receiving the subject information from the emitters 2 within a predetermined range around the optical axis of an image taking lens disposed therein. The digital camera 3 stores the received subject information in association with image data.

Referring to FIG. 1 that is a conceptual illustration of the image taking system 1, shown in the left is the emitters 2 disposed at both sides of a picture 100 that is a subject, and in the right shown is the digital camera 3 having a lens barrel 31. Further, on the back side of the digital camera 3, a LCD panel 35, OK/Cancel button 30c and cross button 30d are shown.

The emitters 2 of the image taking system 1 each have a hood 21, so that light modulated according to subject information and emitted from the emitters 2 is highly directional. A photodetector 33 (see FIG. 3) that will be described later in detail is disposed inside the lens barrel 31 of the digital camera 3. Accordingly, the photodetector 33 can receive light incident on the lens barrel 31 in a limited range around the optical axis of the image taking lens of the digital camera 3.

The emitters 2 of the image taking system 1 are caused to emit light according to the profile of the picture 100 that is subject information, such that light transmits subject information. The subject information received by the photodetector 33 is stored in association with image data obtained by shooting the picture 100.

Figure 2:
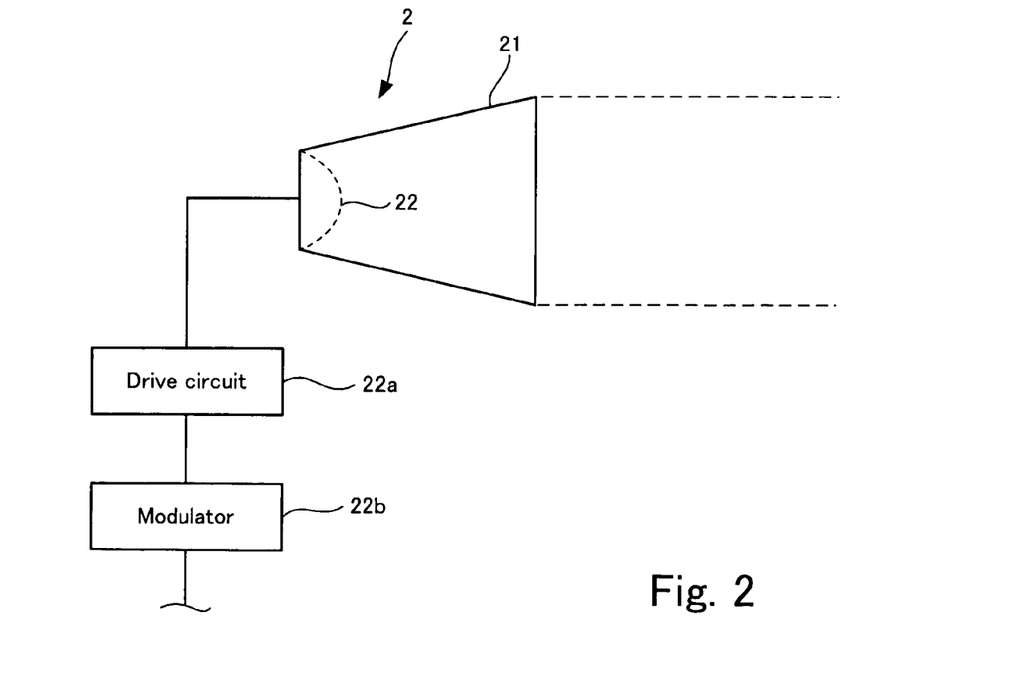
FIG. 2 is a schematic illustration of an emitter of the image taking system shown in FIG. 1.

FIG. 2 is a schematic illustration of the emitter 2.

As shown in FIG. 2, the emitter 2 is composed of a light source 22 and the hood 21 that facilitates directivity of light emitted from the emitter 2. The light source 22 is connected to a drive circuit 22a that controls driving of the light source 22.

A modulator 22b connected to the drive circuit 22a modulates a signal according to subject information and inputs the modulated signal to the drive circuit 22a.

The above mechanism enables the emitter 2 to emit light modulated according to subject information with enhanced directivity.

Figure 3:
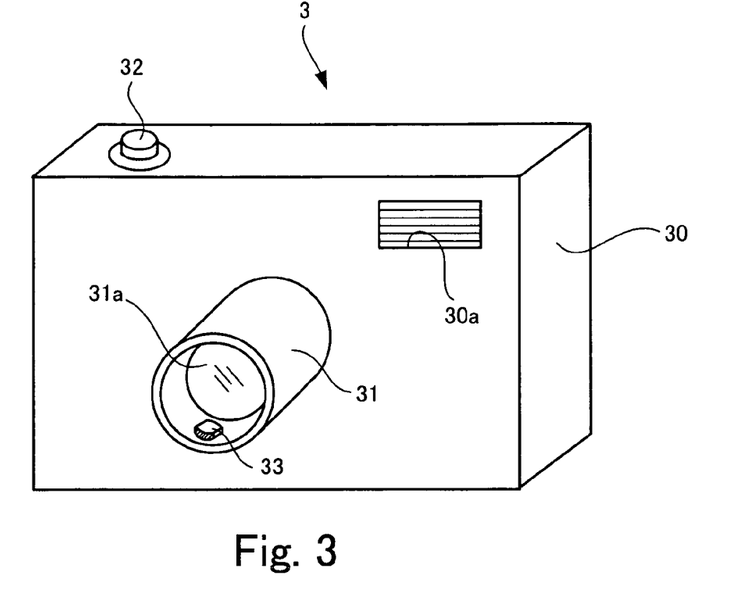
FIG. 3 is an external perspective view of the digital camera shown in FIG. 1, viewed from its front side.

FIG. 3 is an external perspective view of the digital camera 3 viewed from its front side.

The digital camera shown in FIG. 3 is relatively compact with zooming function and has the lens barrel 31 disposed at a substantial center of the front face of a case 30 thereof. On the front face of the case 30, a flash window 30a is also disposed on the upper right side of the lens barrel 31. A shutter button 32 is disposed on the top face of the case 30.

A zoom lens 31a is incorporated in the lens barrel 31 and the photodetector (PD) 33 is disposed in the lens barrel 31 in front of the zoom lens 31a. The photodetector 33 is so positioned as not to interfere with image taking operation by the zoom lens 31a. Zooming-up and zooming-down of the zoom lens 31a is operated by using the cross button 30d.

Figure 4:
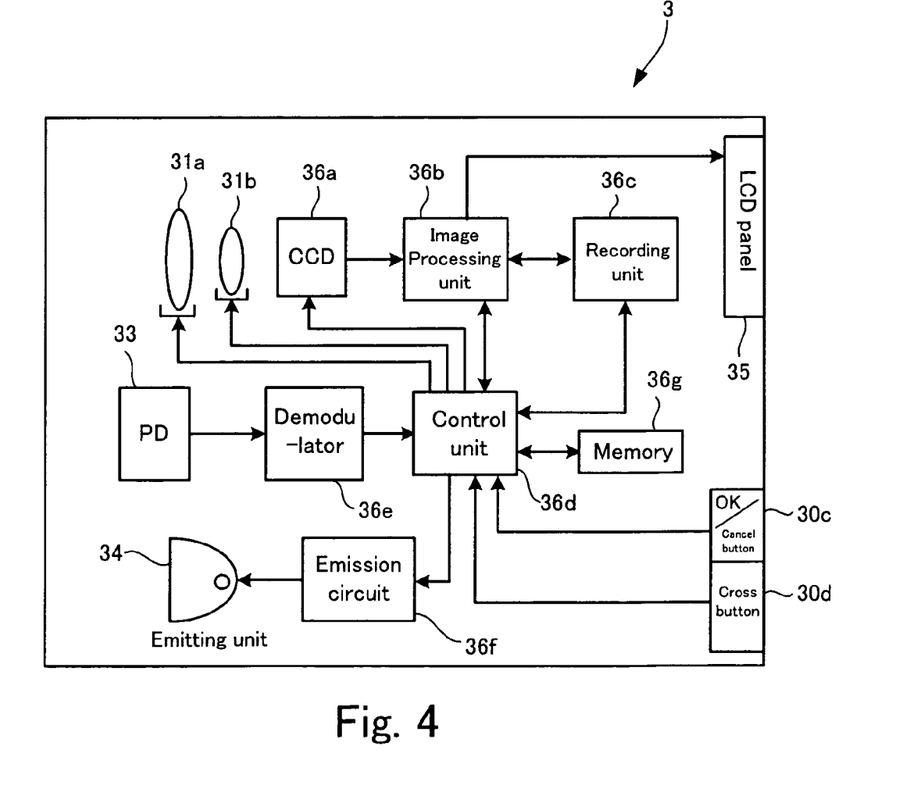
FIG. 4 is an internal block diagram of the digital camera shown in FIGS. 1 and 3.

FIG. 4 is an internal block diagram of the digital camera 3.

Subject light is collected through the zoom lens 31a and a focus lens 31b and the subject image representing the subject light is formed on a Charge Coupled Device (CCD) 36a. The signal representing the subject image is output from the CCD 36a and received and processed into an image data by an image processing unit 36b. The image data is recorded in a recording unit 36c. A memory 36g temporarily stores the subject image. A control unit 36d controls the digital camera 3 in its entirety including driving of the CCD 36a. A demodulator 36e extracts subject information from light received by the photodetector 33. An emission circuit 36f controls an emitting unit 34 and light emitted from the emitting unit 34. A LCD panel 35 displays a through image (a live view) and an image representing image data recorded in the recording unit 36c. The cross button 30d is used to switch between image-taking mode and playback mode in which an image representing recorded image data is displayed on the LCD panel 35. The cross button 30d is also used to select an icon displayed on the LCD panel 35, which is confirmed by the OK/Cancel button 30c.

It should be noted that the emitter 2 of the image taking system 1 can transmit subject information in association with field angle. For example, when taking a picture of monkeys at a zoo, subject information for wide angle may be transmitted if a general view of the monkeys is desired, or subject information for telephoto angle may be transmitted if a close-up of a monkey is wanted. The digital camera 3 that obtains subject information from received light emitted from the emitter 2 is adapted to detect a field angle at every shooting operation. If the subject information is associated with field angle, only the subject information that matches the field angle detected by the digital camera 3 is recorded in the recording unit 36c in association with image data representing a taken subject image.

Figure 5:
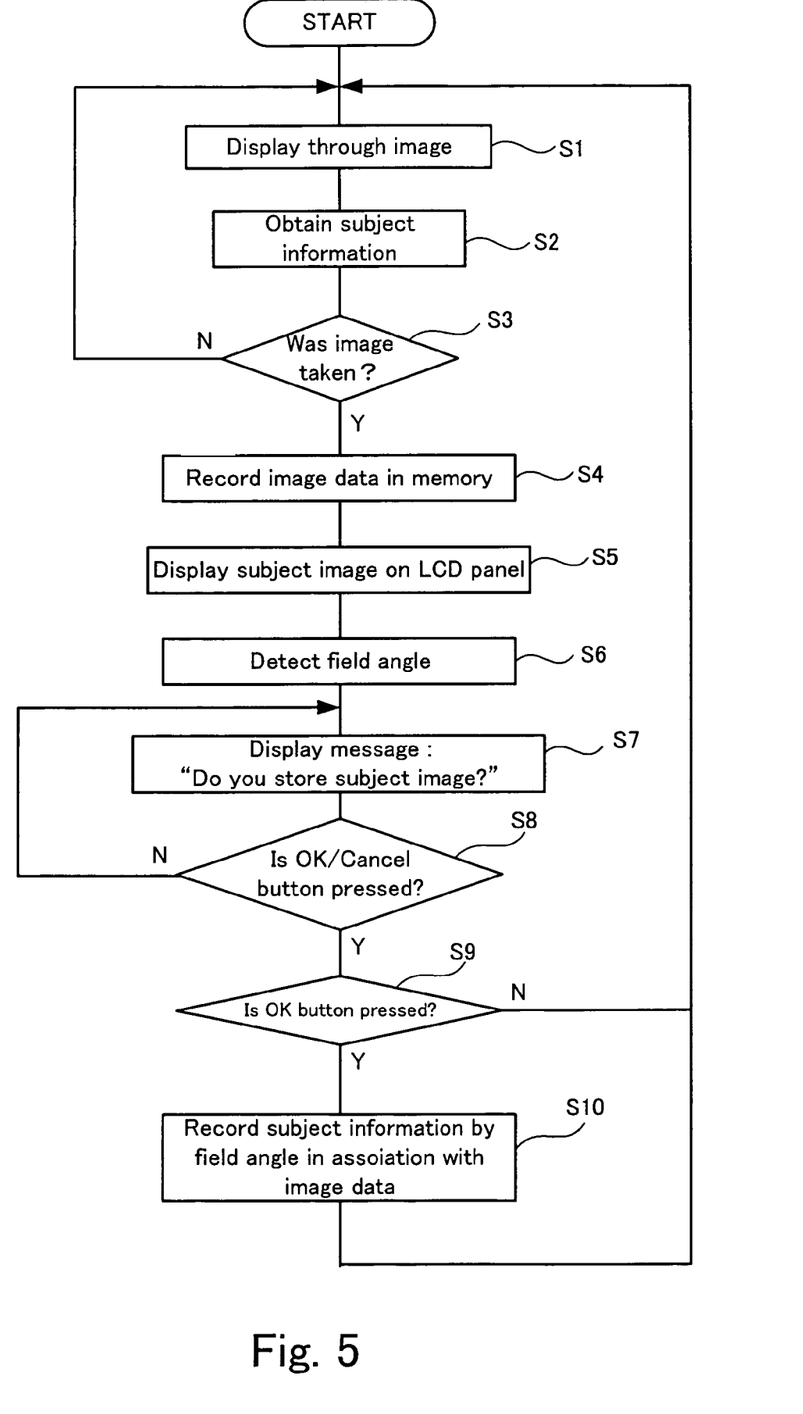
FIG. 5 is a flowchart showing the routine procedure of the digital camera of the first image taking system activated by selecting an image taking mode.

FIG. 5 is a flowchart showing the routine procedure of the digital camera 3 activated by selecting an image taking mode.

In step S1, upon selection of an image taking mode, the control unit 36d instructs the LCD panel 35 to display a through image. In step S2, subject information is obtained from received light emitted from the emitters 2. In step S3, it is determined whether any shooting is performed. If it is determined that no shooting is performed, the flow goes back to step S1. If it is determined that any shooting is performed, the flow goes to step S4, in which subject image obtained by shooting is temporarily stored in the memory 36g. In step S5, the subject image is displayed on the LCD panel 35. In step S6, the current field angle is detected based on the respective positions of the zoom lens 31a and the focus lens 31b in the lens barrel 31. In step S7, the subject image is displayed on the LCD panel 35 with a massage: "Do you store the subject image?" In step S8, it is determined whether the OK/Cancel button 30c is operated in response to the massage. If it is determined that the OK/Cancel button 30c is not operated, the flow goes back to step S7. If it is determined that the OK/Cancel button 30c is operated, the flow goes to step S9, in which it is determined whether the "OK" is pressed. If it is determined that the "Cancel" is pressed, the flow goes back to step S1. If it is determined that the "OK" is pressed, the flow goes to step S10. In step S10, if subject information is associated with field angle, the subject information for the field angle that matches the detected field angle in step S6 is stored in the recording unit 36c (see FIG. 4) in association with image data obtained by shooting.

As described in the above, in the image taking system 1, light emitted from the emitters 2 and received by the digital camera 3 is highly directional. Besides, light is received around the optical axis of the zoom lens 31a, so that a subject image obtained by shooting can match the content of subject information transmitted through light more readily than conventional techniques. Accordingly, the image taking system 1 realizes prompt extraction of a desired subject image. Additionally, if a content of subject information is associated with field angle, only the subject information for the field angle that matches the field angle at the time of shooting is stored in association with image data. Therefore, the subject image and the subject information can be accurately matched, thereby enabling prompt extraction of a desired image.

Figure 6:
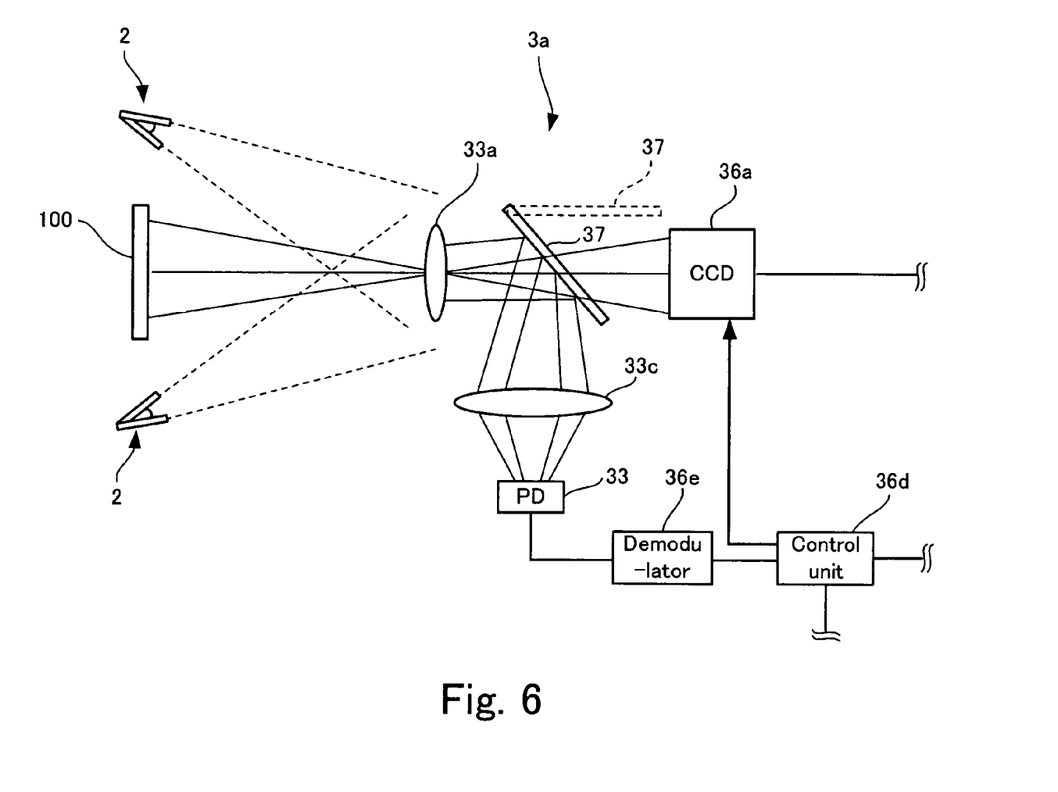
FIG. 6 is a schematic illustration showing another example of a digital camera according to the first image taking system.

FIG. 6 is a schematic illustration showing another example of a digital camera.

The digital camera 3 of FIG. 1 has the photodetector 33 that is disposed inside the lens barrel 31 in front of the zoom lens 31a. On the other hand, in a digital camera 3a, a photodetector 33 is disposed on the flank of the lens barrel 31 facing in a direction perpendicular to the optical axis of light incident upon a zoom lens 33a. The digital camera 3a has a tiltable mirror 37 and a focus lens 33c incorporated in the lens barrel 31. Before the shutter button 32 is pressed, the mirror 37 is tilted by 45 degrees relative to the optical axis and causes light incident upon the lens barrel 31 to be reflected and reach the photodetector 33 through the focus lens 33c. When the shutter button 32 is pressed, the mirror 37 is retracted into the flank of the lens barrel 31 so as not to interfere with shooting operation. The digital camera 3a according to the image taking system 1 also enables rapid extraction of a desired subject image.

In the above embodiment of the image taking system 1, light modulated according to subject information is transmitted from an emitter with high directivity and received by an image taking apparatus within a predetermined range with high directivity. However, electric wave may be employed instead of light as long as subject information is transmitted and received with high directivity.

Now, a second image taking system will be described below.

Figure 7:
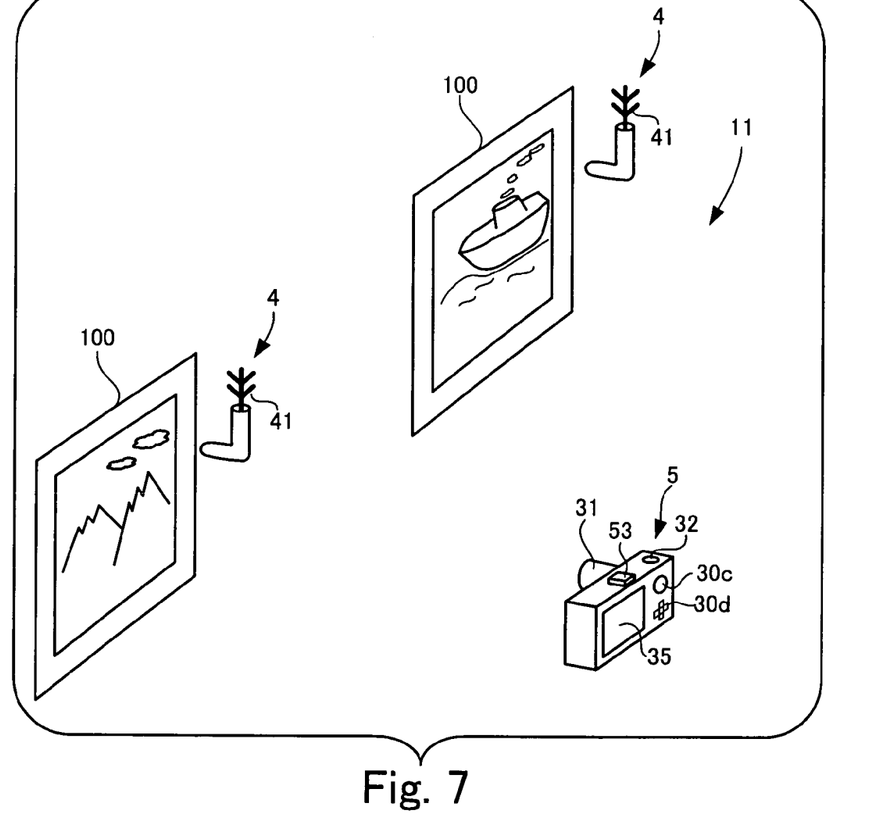
FIG. 7 shows a conceptual illustration of one embodiment of a second image taking system according to the invention.

FIG. 7 shows a conceptual illustration of a second image taking system 11.

The second image taking system 11 of FIG. 7 is composed of transmitters 4 and a digital camera 5. Pictures 100 that are subjects for shooting and assumed to be hung on a wall have the transmitter 4 respectively disposed thereabout. The transmitters 4 each transmit subject information forward from the front side of the picture 100 through an antenna 41 disposed therein. The digital camera 5 is shown facing the picture 100.

Figure 8:
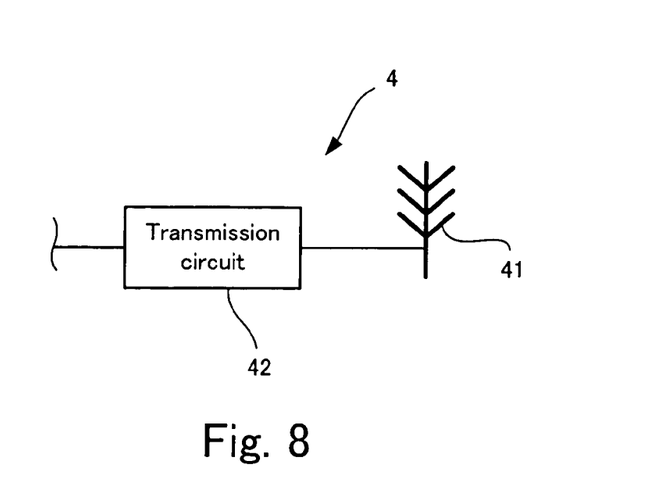
FIG. 8 is a schematic illustration of a transmitter of the second image taking system shown in FIG. 7.

FIG. 8 is a schematic illustration of the transmitter 4.

The transmitter 4 is composed of the antenna 41 and a transmission circuit 42. Subject information is electrically transmitted through the antenna 41.

Figure 9:
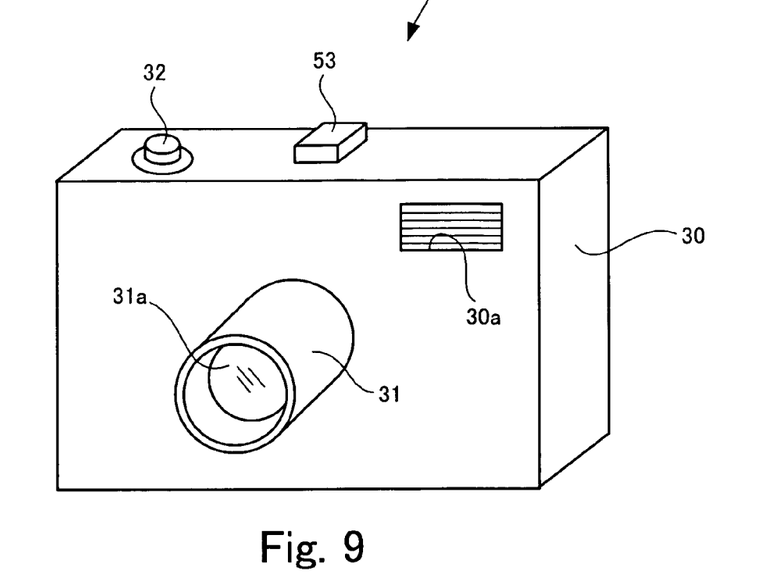
FIG. 9 is an external perspective view of the digital camera shown in FIG. 7, viewed from its front side.

FIG. 9 is an external perspective view of the digital camera 5 viewed from its front side. In the digital camera 5 shown in FIG. 9, a receiver 53 that receives subject information transmitted from the transmitter 4 shown in FIG. 8 is disposed on the top face of a case 30. In FIG. 9, the elements identical with FIG. 3 are denoted with the same reference characters with FIG. 3.

Figure 10:
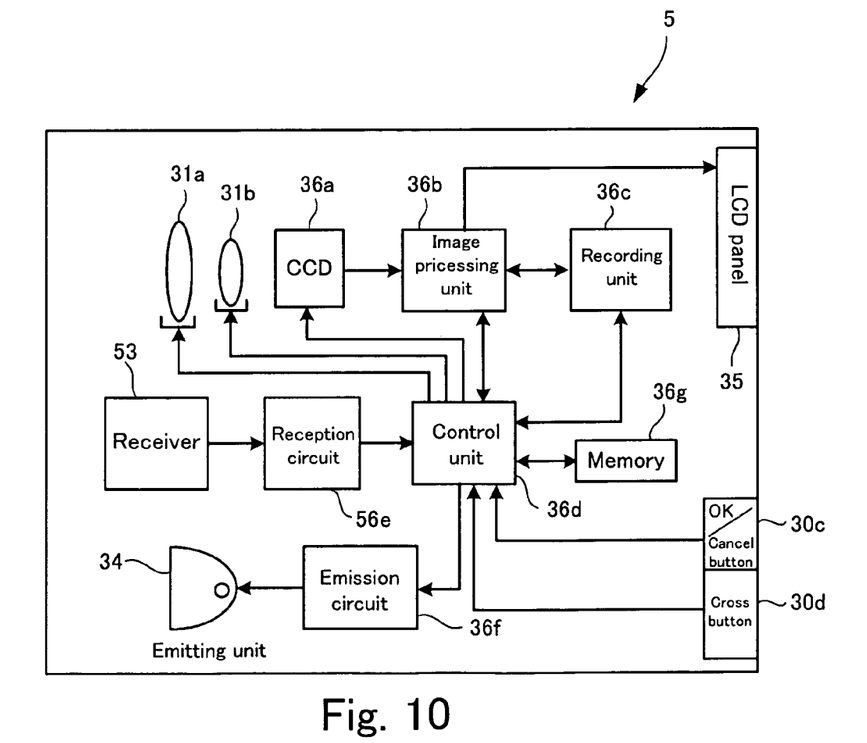
FIG. 10 is an internal block diagram of the digital camera shown in FIGS. 7 and 9.

FIG. 10 is an internal block diagram of the digital camera 5.

FIG. 10 is different from FIG. 4 in that the photodetector 33 and demodulator 36e of FIG. 4 are respectively replaced with a receiver 53 and reception circuit 56e. Other elements are identical with those in FIG. 4 and thus, further explanation is omitted.

Figure 11:
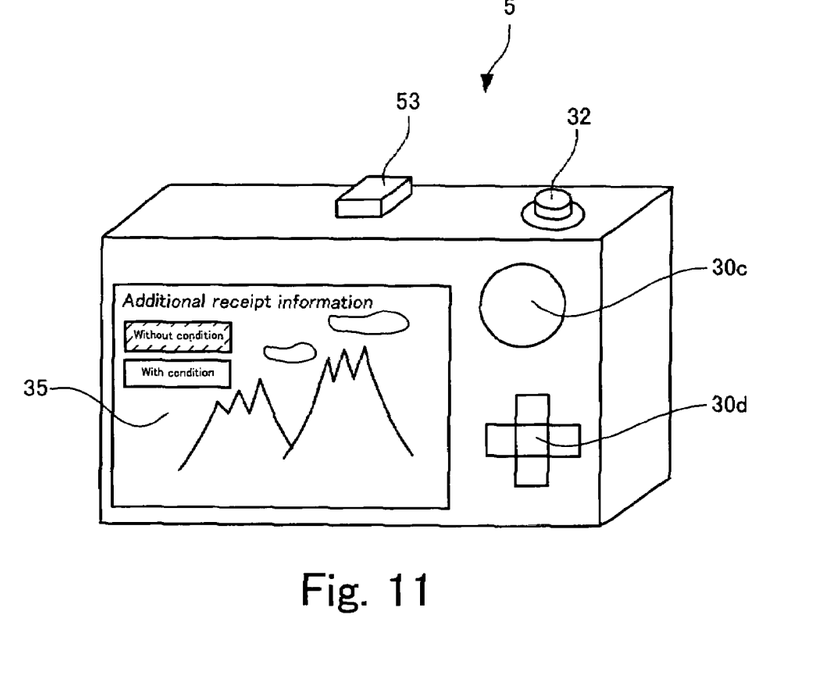
FIG. 11 shows a screen displayed on a LCD panel of the digital camera.

FIG. 11 shows a screen displayed on the LCD panel 35 of the digital camera 5.

In FIG. 11, it is assumed that a user took an image of the mountain in the left-side picture 100 shown in FIG. 7 and has determined to store the taken image in the recording unit 36c. Now, the taken image is displayed on the LCD panel 35 with icons "Without condition" and "With condition" as well as a message: "Additional receipt information." The icons can be selected by using the cross key 30d and confirmed by using the OK/Cancel button 30c. In FIG. 11, "Without condition" is selected as initial setting.

Figure 12:
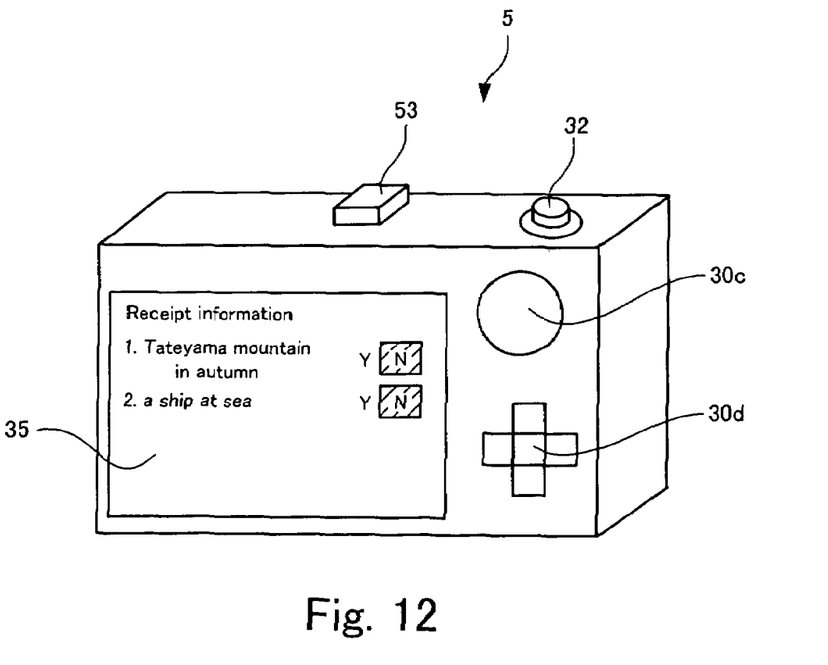
FIG. 12 shows a screen displayed by selecting an icon "with condition" shown in FIG. 11, using a cross button.

FIG. 12 shows a screen displayed by selecting the icon "With condition" shown in FIG. 11 using the cross button 30d.

In FIG. 12, all the subject information received by the receiver 53 of the camera 5 are displayed on the LCD panel 35. Here, displayed on the LCD panel 35 are subject information transmitted from the transmitters 4 that are disposed respectively near the picture of the mountain and of the ship shown in FIG. 7 and received by the receiver 53 of the digital camera 5.

More specifically, displayed on the LCD panel 35 are "Tateyama mountain range in autumn" and "a ship at sea" transmitted and received as subject information of the both pictures 100 together with icons "Y/N" that is used to select on whether the taken image should be stored in association with the corresponding subject information. In FIG. 12, "N" is selected in both subject information as initial setting. However, a user is to select "Y" for "Tateyama mountain range in autumn," and "N" for "a ship at sea" because the taken subject image is the one for "Tateyama mountain range in autumn" as shown in FIG. 11.

Figure 13:
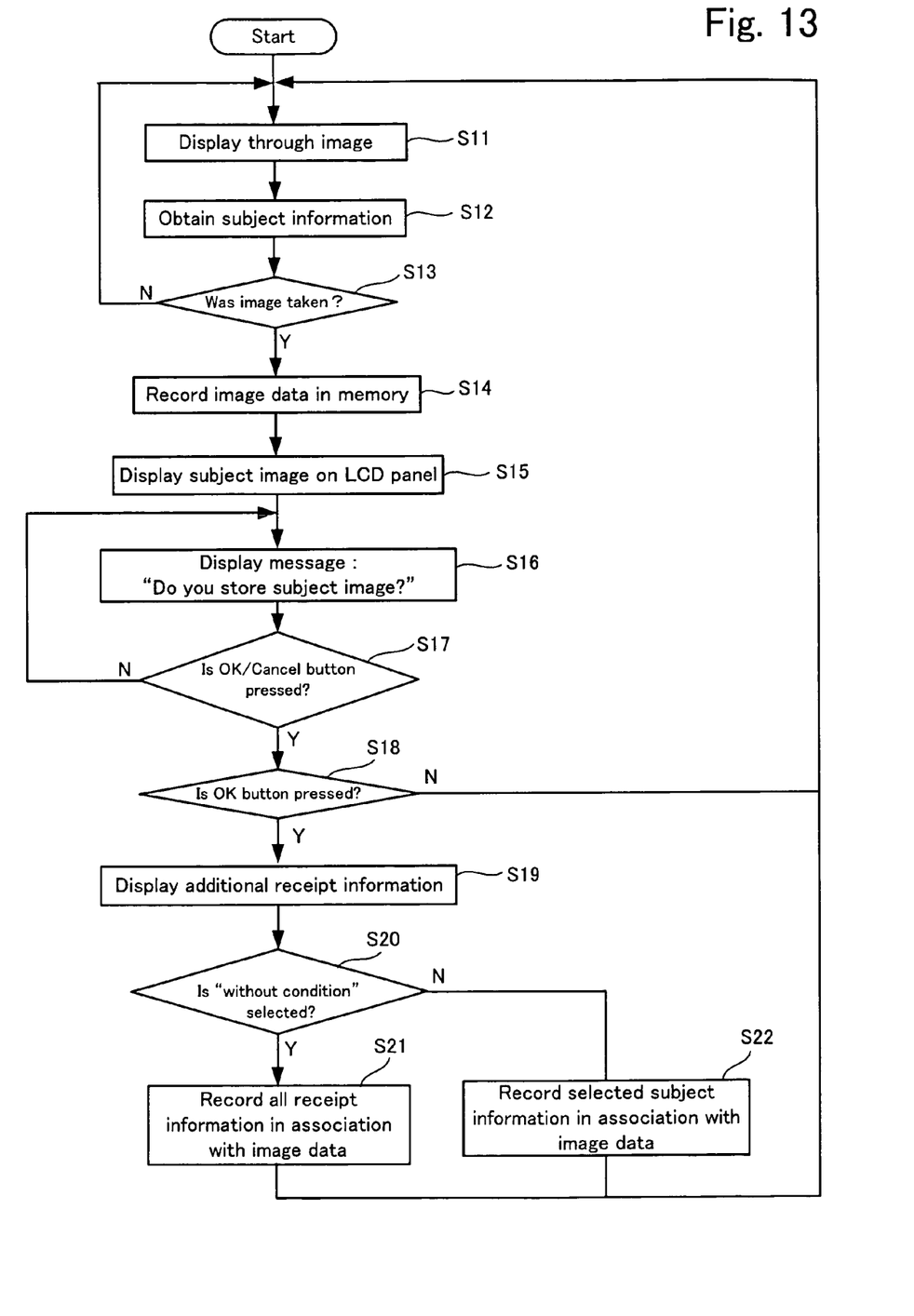
FIG. 13 is a flowchart showing the routine procedure of the digital camera of the second image taking system activated by selecting an image taking mode.

FIG. 13 is a flowchart showing the routine procedure of the digital camera 5 activated by selecting an image taking mode. In step S11, upon selection of an image taking mode, the control unit 36d instructs the LCD panel 35 to display a through image. In step S12, subject information from the transmitters 4 is received by the receiver 53. In step S13, it is determined whether any shooting is performed. If it is determined that no shooting is performed, the flow goes back to step S11. If it is determined that any shooting is performed, the flow goes to step S14, in which image data representing a subject image is temporarily stored in the memory 36g (see FIG. 10). In step S15, the subject image is displayed on the LCD panel 35. In step S16, with the subject image displayed, a message: "Do you store the subject image?" is also displayed on the LCD panel 35. In step S17, it is determined whether the OK/Cancel button 30c is operated in response to the massage. If it is determined that the OK/Cancel button 30c is not operated, the flow goes back to step S16. If it is determined that the OK/Cancel button 30c is operated, the flow goes to step S18, in which it is determined whether the "OK" is pressed. If it is determined that the "Cancel" is pressed, the flow goes back to step S11. If it is determined that the "OK" is pressed, the flow goes to step S19, in which the additional receipt information shown in FIG. 11 is displayed. In step S20, it is determined whether "Without condition" is selected. If it is determined that "Without condition" is selected, all the subject information is stored in association with the taken image and goes back to step S11. If it is determined that "With condition" is selected, the selected subject information is stored in association with the taken image and goes back to step S11.

As described in the above, the image taking system 11 selects appropriate subject information for the taken image from the received subject information and stores it in association with the taken image. Thus, the image taking system can extract a desired image rapidly.

What is claimed is:

1. An image taking system comprising:
   a transmitter that is disposed near a subject and transmits subject information of the subject; and
   an image taking apparatus that has a receiver capable of receiving the subject information transmitted from the transmitter and stores in a memory the subject information received by the receiver in association with image data representing a subject image obtained by image taking through an image taking lens,
      wherein the transmitter transmits the subject information in a predetermined direction, and
      the receiver is capable of receiving the subject information within a predetermined range around an optical axis of the image taking lens, and the image taking apparatus stores in the memory the subject information received by the receiver within the predetermined range in association with the image data, and
   wherein the transmitter is adapted to transmit the subject information by field angle, and
   the image taking apparatus is adapted to freely change field angle of a subject, and
   the image taking apparatus further comprises:
   a field angle detecting unit, and stores in the memory the subject information by field angle, out of all the subject information received by the receiver, that corresponds to the field angle detected by the field angle detecting unit, in association with the image data.

2. The image taking system according to claim 1, wherein the transmitter has a light source and drives the light source to modulate light emitted therefrom according to subject information such that the light emitted from the light source is adapted to transmit the subject information, the receiver has a light receiving element that receives the emitted light, and the image taking apparatus stores in the memory the subject information obtained from signals output from the light receiving element in association with the image data.

3. The image taking system according to claim 1, wherein the subject image and the subject information can be accurately matched, thereby enabling prompt extraction of a desired image because only the subject information for the field angle that matches the field angle at the time of shooting is stored in association with the image data.

* * * * *